ly detailed description of a preferred embodiment for

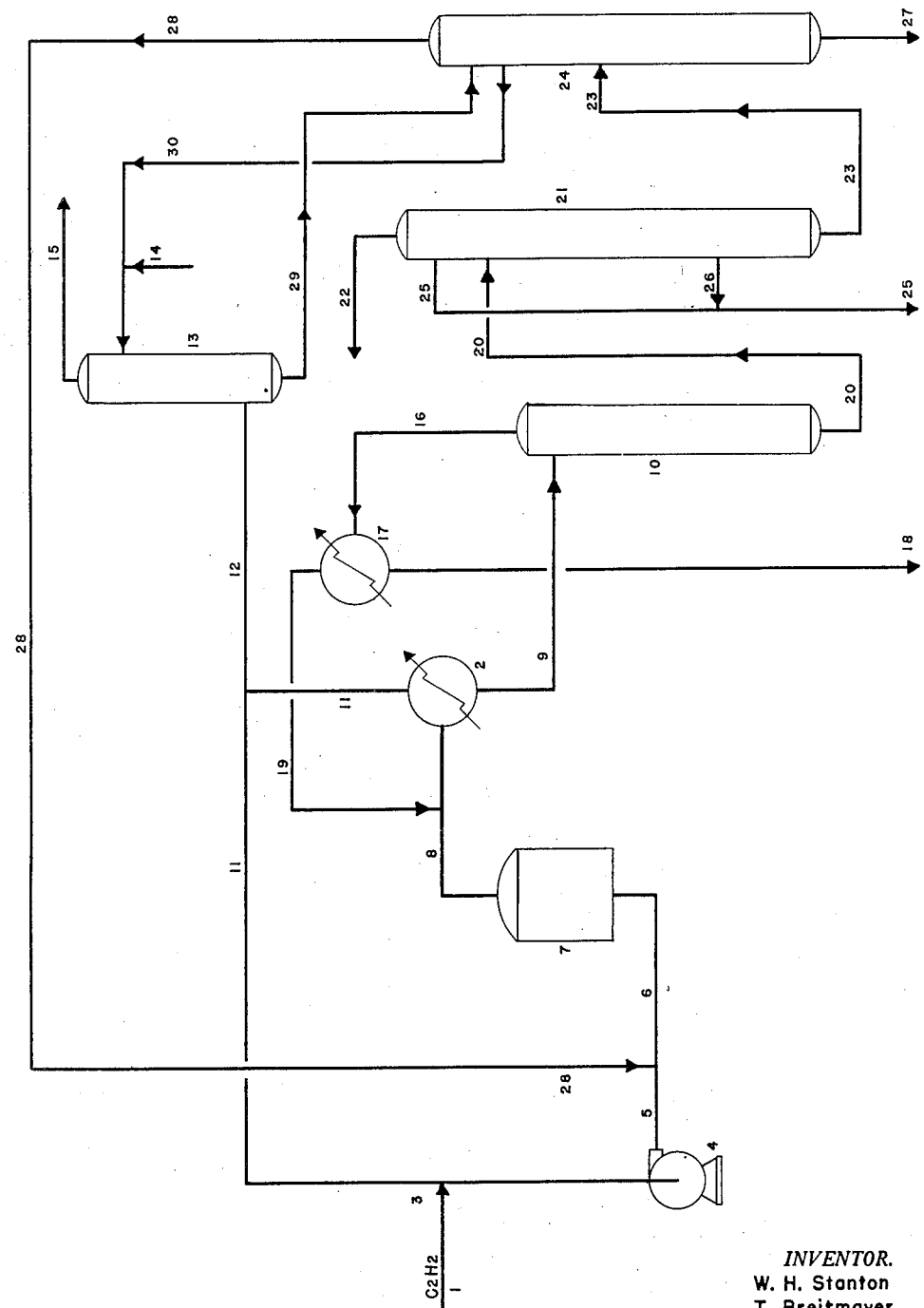

United States Patent Office 2,794,827
Patented June 4, 1957

2,794,827

VINYL ACETATE PROCESS

Walter H. Stanton and Theodore Breitmayer, Texas City, Tex., assignors to Monsanto Chemical Company, St. Louis, Mo., a corporation of Delaware Application December 4, 1952, Serial No. 323,974

4 Claims. (Cl. 260—498)

This invention relates to the production of vinyl esters and more particularly to an improved process for the production of vinyl acetate.

The vapor phase catalytic reaction between acetylene and a carboxylic acid to produce a vinyl ester is a well known reaction. All of the developed processes using this reaction, however, call for vaporization of the liquid acid in a separate step to provide the acid feed to the reactor. It has now been determined that the efficiency of the process may be significantly increased and the amount of equipment required reduced, thus reducing capital and operating expenses, if the acid vapor from the acid fractionator, a necessary part of any such process, is directed to serve as acid feed to the reactor. This and other related improvements are provided in the process of the invention.

It is an object of the invention to provide an improved process for the production of vinyl esters by the vapor phase reaction of acetylene and a carboxylic acid in the presence of suitable catalysts.

Another object is to provide a catalytic process for the production of esters such as vinyl acetate from acetylene and a carboxylic acid whereby yields are increased, hazards attendant upon acetylene handling are reduced, and both capital and operating costs are minimized.

Other objects and advantages will become apparent from the following description of the invention.

According to the invention, acetylene and carboxylic acid vapors are admixed, preheated, and passed through a reactor packed with a suitable catalyst. The reaction gases are partially condensed, the condensate is stripped of acetylene and some by-products such as aldehydes or ketones, and the acetylene-rich stream is recycled to the reactor. A portion of the recycle gas stream is vented to prevent a build-up of inert gas in the system and the vented gas is scrubbed with the carboxylic acid to remove acetylene.

The stripped condensate is fractionated to obtain the pure vinyl ester. By-products or impurities such as divinyl acetylene and unsaturated aldehydes are removed as sidestreams from the vinyl ester fractionator while the crude carboxylic acid is conducted from the bottom of the column to an acid fractionator.

In the acid fractionator, the carboxylic acid is separated from high boilers; acetylene is stripped from the acid from the vent scrubber which is introduced as reflux to the column, the stripped acid being recycled to the scrubber; and water in the acid feed is contacted with by-product acid anhydride in the column to produce more acid. Make-up carboxylic acid to the process is introduced via the vent scrubber. A batch column is provided to further process side streams and high boilers.

The acid vapor from the fractionator is mixed with the compressed stream of dry feed acetylene and recycle gas from the compressor and fed to the reactor.

The process of the invention is illustrated in the following detailed description of a preferred embodiment for the production of vinyl acetate from acetylene and acetic acid. References are made to the attached drawing which presents a diagrammatic flow sheet.

Dry acetylene gas containing about 98% acetylene is admitted through line 1 where it is admixed with recycle gas from the condenser 2, entering at point 3. The mixed stream is compressed in compressor 4 and passed into line 5 where it is admixed with acetic acid vapors from the acetic acid column coming through line 28. The combined vapors flow through line 6 into the reactor 7. The reactor is packed with a catalyst of zinc acetate impregnated on coke and maintained at a temperature from 200–220° C. The reaction gases containing, in addition to vinyl acetate, some acetaldehyde, acetic anhydride, acetone, ethylidene diacetate and trace quantities of divinylacetylene and crotonaldehyde, are heat exchanged with incoming gases (not shown) and passed through line 8 to condenser 2, where they are cooled to 32° C. The condensate is withdrawn via line 9 and transferred to the light ends column 10. Gases from the condenser 2 are recycled to the reactor via line 11 and enter at point 3 as previously described. A portion of this stream (approximately 1%) is vented to prevent the build-up of inert material in the system by passing gas through line 12 into the vent scrubber 13 where the vented gases are scrubbed with acetic acid, which enters through line 14, to remove acetylene. This is the point at which acetic acid is fed into the system. Inert gases after scrubbing are discharged to the atmosphere or to a flare through line 15.

In column 10, acetylene, acetaldehyde, and acetone are stripped from the condensate. The acetaldehyde, acetone and some vinyl acetate are removed by withdrawing overhead vapor via line 16 from the column into the condenser 17 from which the condensate is fed to a batch column via line 18 for further processing and the acetylene-rich stream is recycled via line 19 to condenser 2.

The stripped condensate from column 10 is fed through line 20 to fractionating column 21 where pure vinyl acetate is taken overhead through line 22 to storage or rundown tanks. Crude acetic acid is withdrawn from the bottom of this column through line 23 and introduced into fractionating column 24. Sidestreams of crotonaldehyde and divinylacetylene (or any other material boiling between acetic acid and vinyl acetate) are removed via lines 25 and 26 and sent to a batch column for further recovery of their vinyl acetate and acetic acid content.

From the acetic acid column 24, acetic acid vapors are taken overhead via line 28 to serve as raw material feed to the reactor entering line 5 and admixing with the dry feed acetylene and recycle gas coming from the compressor 4. Reflux is supplied to the acetic acid fractionator by means of the stream of acetic acid coming, via line 29, from the vent scrubber where it has been used to scrub acetylene from the vent gases. Acetylene is stripped from this stream in the top section of the fractionator and sent overhead through line 28 with the acetic acid vapors. Water in the acetic acid feed is contacted in this column with by-product acetic anhydride and the latter is thereby converted to acetic acid. A sidestream of acetic acid is recycled from the fractionator via line 30 to the vent scrubber. The bottoms from the acetic acid column 24 are sent to a batch column via line 27.

Acetic acid and vinyl acetate removed from the batch column are recycled to the acetic acid and vinyl acetate fractionators respectively. By-product acetaldehyde of high purity (approximately 98%) is intermittently recovered from the batch column while a gas stream containing crotonaldehyde, divinylacetylene, and other impurities is removed, mixed with natural gas, and flared.

The residue from the batch column, mostly ethylidene diacetate and high boilers or tars, is disposed of by burning or some other convenient means.

In carrying out the novel improved process of this invention, the specific reactants, quantities of reactants, and reactant conditions set forth in the preferred embodiment are subject to substantial variation. For example, the process is not limited to the production of vinyl acetate but applicable to the preparation of vinyl esters generally. Vinyl formates, propionates, butyrates, benzoates, etc., may be produced by the process of the invention by reacting the respective carboxylic acids with acetylene. Lower aliphatic monocarboxylic acids containing from one to seven carbon atoms are to be preferred.

The acetylene and carboxylic acid vapor mixture can be passed through the reactor in equimolecular proportions or with either reactant in excess. It is preferred to operate at an acetylene to acid molecular ratio of 4 to 1. At this ratio, about 30–40% of the acid is reacted per pass. These dilute conditions and partial reaction promote increased catalyst life.

Any of the catalysts commonly employed for the vapor phase reaction of acetylene and carboxylic acids may be employed in the process of the invention. Suitable catalysts include zinc or cadmium salts of the carboxylic acids of which it is desired to prepare the vinyl esters, mercury salts such as mercury acetate, mercuric chloride, etc., free phosphoric acid, zinc and cadmium chromites, and silicates and polysilicates of zinc and cadmium. These compounds may be supported on carriers such as activated carbon, wood charcoal, silica gel, activated alumina, etc.

In general, the process of the invention is operated at temperatures in the range of 180°–300° C. The upper temperature limit at which the process is operable depends upon the thermal stability of the compounds involved. The use of temperatures within the range of 180°–300° C. is preferred. The actual values selected within the preferred range are dependent upon the properties of the acid and the activity of the catalyst. Optimum temperature is one which is high enough to maintain the acid in a vaporous condition during contact with the catalyst and one at which catalyst efficiency approaches a maximum as indicated by an exothermic effect within the catalyst bed.

Operation at atmospheric pressure is preferred but, if it is necessary in some instances to insure a practical rate of reaction, superatmospheric pressures may be employed.

While the process of the invention has been described with relation to the preparation of vinyl esters, it is equally applicable with the proper adjustment of temperatures, acetylene-to-acid molecular ratios, etc., known to those skilled in the art in the production of ethylidene diesters with all the attendant advantages.

It will be seen from the foregoing description that a number of advantages are attained by the process of the invention which are not realized in those of the prior art. Increased yields are achieved by reacting fresh acetic acid containing about 0.5 weight percent water with by-product acetic anhydride in the acid fractionator. No such provision is made in other known processes. The employment of the large recycle of acetic acid specified for the vent scrubber, also increases overall yields since it reduces acetylene losses significantly. Previous processes have been limited in the amount of acetic acid available for scrubbing vent gases to the amount required for make-up in the process. Provision for the removal of impurities boiling between the carboxylic acid and the vinyl ester by means of side cuts from the columns makes more of the acid available for recycle. In the prior art processes, such impurities are removed by withdrawing a portion of the recycle acid for use in other processes. The process of the invention also eliminates the necessity for an acid vaporizer, an acetylene stripper, and an acetic acid reflux condenser and thus results in reduced capital and operating expenses.

What is claimed is:

1. In a process for the production of vinyl esters by the vapor phase reaction of acetylene and a monocarboxylic acid chosen from the group consisting of the lower aliphatic monocarboxylic acids containing from 1 to 7 carbon atoms and benzoic acid in the presence of a catalyst to produce a gaseous product containing the vinyl ester, unreacted carboxylic acid and other impurities, wherein said product is condensed and subjected to fractionation in a series of separate fractionation zones to separate the various components from each other, and wherein unreacted monocarboxylic acid is withdrawn as overhead vapors from one of said fractionation zones, the improvement which comprises introducing liquid monocarboxylic acid as reflux to said latter mentioned fractionation zone, withdrawing pure monocarboxylic acid vapors overhead from said zone, and utilizing said vapors as the feed to said process.

2. A process as described in claim 1 wherein the vinyl ester is vinyl acetate and the monocarboxylic acid is acetic acid.

3. In a process for the production of vinyl esters by the vapor phase reaction of acetylene and a monocarboxylic acid chosen from the group consisting of the lower aliphatic monocarboxylic acids containing from 1 to 7 carbon atoms and benzoic acid in the presence of a catalyst to produce a gaseous product containing the vinyl ester, unreacted carboxylic acid and other impurities, wherein said product is condensed and subjected to fractionation in a series of separate fractionation zones to separate the various components from each other, and wherein unreacted monocarboxylic acid is withdrawn as overhead vapors from one of said fractionation zones, the improvement which comprises recycling any uncondensed gases to the reactor, venting a portion of the recycled gases through a scrubbing zone where the monocarboxylic acid is employed as a scrubbing agent to remove acetylene, introducing said monocarboxylic acid employed as a scrubbing agent as reflux to said latter mentioned fractionation zone, withdrawing pure monocarboxylic acid overhead from said zone and utilizing such vapors as the feed to such process.

4. A process as described in claim 3 wherein the vinyl ester is vinyl acetate and the monocarboxylic acid is acetic acid.

References Cited in the file of this patent

UNITED STATES PATENTS

| 2,547,916 | Wenner | Apr. 3, 1951 |
| 2,552,425 | Halbig | May 8, 1951 |